Feb. 23, 1960  H. FRIEDMAN  2,926,257
METHOD OF MEASURING THE THICKNESS OF THIN COATINGS
Filed May 16, 1955

INVENTOR.
HERBERT FRIEDMAN.
BY
AGENT.

United States Patent Office 2,926,257
Patented Feb. 23, 1960

2,926,257

METHOD OF MEASURING THE THICKNESS OF THIN COATINGS

Herbert Friedman, Arlington, Va.

Application May 16, 1955, Serial No. 508,340

7 Claims. (Cl. 250—53)

My invention relates to a non-destructive method for measuring the thickness of a thin coating on a base of chemically disparate material.

In particular, my invention relates to the measurement of thin coatings by means of X-radiation and specifically of the characteristic X-radiation of elements contained in the coating. More particularly, each chemical element when suitably X-irradiated emits radiation having a wavelength characteristic of that element which is often referred to as the fluorescent X-radiation of that element. Thus, if an element is excited by means of a beam of cathode rays or X-radiation of a suitable wavelength, the material will emit X-radiation characteristic of the elements contained therein which may be separated by suitable filtering arrangements and detected both as to wavelength and as to intensity.

It is a principal object of my invention to describe a non-destructive method of measuring the thickness of a thin coating on a chemically disparate material.

Another object of my invention is to measure the thickness of a thin coating on a base of chemically disparate material irrespective of the nature of either the coating or the base materials.

It is a still further object of my invention to provide a method whereby the thickness of a thin coating on a base of chemically disparate material may be simply and efficiently controlled.

It is a still further object of my invention to provide a method of measuring the thickness of a thin coating on a base of chemically disparate material which is wholly independent of the constitution of the base material and which relies solely on the chemical constitution of the coating material.

These and further objects of my invention will appear as the specification progresses.

In accordance with my invention I utilize the principles set out above that each chemical element when suitably excited emits X-radiation in a characteristic wavelength for that element in a novel manner for determining the thickness of any thin coating on a base of chemically disparate material. More specifically, I have found that if I excite a sample of the material having a coating chemically different than the substratum with X-radiation having a wavelength and intensity which excites an element of a coating producing therein characteristic X-radiation or fluorescent radiation, the intensity per unit area of this X-radiation can be employed to measure the thickness of the coating on the substratum.

The specific means for carrying out the method according to my invention, will be described in a detailed description which follows:

In general, I excite a sample of coated material with X-radiation having a wavelength shorter than the absorption edge of at least one of the elements contained in the coating, i.e. that wavelength below which the material is excited into producing its own characteristic or fluorescent radiation. Values of the absorption edges for each of the elements may be found in tables that have been prepared for that purpose. If the coating contains more than one element, it is necessary only to excite one of the elements in the coating into emitting its own characteristic or fluorescent X-radiation. This fluorescent X-radiation can be detected by a suitable detector such as a Geiger-Muller tube or a proportional counter or scintillation counter and the intensity of radiation emitted by that element in the coating measured. From a comparison of the relative intensities of the sample of known thickness and the sample, the thickness of which is to be measured, the thickness of the latter can be determined.

Alternatively, comparison with a sample having coating of a known composition and thickness may be dispensed with and the following procedure employed. Assuming that a monochromatic source $I_0$ of X-radiation is available, the intensity $I\infty$ of the fluorescent line emitted by the coating is a measure of thickness because the contribution to the intensity by a volume $ax$ where $a$ is the beam cross-section and $x$ the depth below the surface is given by $$dI = kI_0 e^{-[(\mu_1/\sin\theta_1)+(\mu_2/\sin\theta_2)]\rho} dx$$

where (1) $k$ is the conversion coefficient from primary to secondary radiation, (2) $\mu_1$ and $\mu_2$ are the mass absorption coefficients for primary and secondary wavelengths, (3) $\rho$ is the density, (4) $\theta_1$ and $\theta_2$ are the incident and receiving angles with respect to the surface, (5) $x=$depth below surface.

The ratio of the integral for $x=d$ to $x=\infty$ is $$Id/I_\infty = 1 - e^{-[(\mu_1/\sin\theta_1+\mu_2/\sin\theta_2)]d}$$

where:

$d=$thickness of the unknown coating, $Id$ is the intensity of the fluorescent line produced by the unknown coating, and the remaining symbols have the meanings as above.

It is thus apparent that the angles of incidence and emergence, $\theta_1$ and $\theta_2$, respectively of the primary and secondary X-rays must be known in order to determine the thickness of the layer. Accordingly, in carrying out the method according to the invention, an area of limited cross-section is exposed to a beam of primary X-rays at a given or predetermined angle and, similarly, the detector is positioned to intercept secondary X-rays emerging at a given angle with respect to the surface of the layer.

If the coating contains more than one element, or if the base contains elements which are lighter than any elements in the coating and thus may give rise to X-ray fluorescence at the same time the elements in the coating give rise to their characteristic X-radiation, it is necessary to filter out the undesired fluorescent X-radiation. This may be accomplished by disposing between the sample and the detector a suitable filter which will filter out wavelengths of radiation other than the wavelength of the radiation of the element used as the measuring standard or else suitable electric circuits such as a pulse height discriminator which is coupled to the detector and filters out electric pulses corresponding to wavelengths of radiation other than the desired wavelength.

By means of suitable exciting radiation and filters, it is possible to separate fluorescent radiation of two elements separated by only one atomic number. Thus it is possible to measure the thickness of a film containing an element separated by one atomic number from an element in the substratum. The principal application of my invention lies in the measurement of a thickness of films containing elements which are separated by one, two, or more atomic numbers from the elements in the base. More particularly, my invention may be employed for measuring the thickness of paint films on metal surfaces, measuring galvanized coatings on steel, tin plate on iron, zinc plated metals, silver on copper, chromium on copper, metal coatings on glass such as the anti-reflective coatings used on glass lenses, thin metal coatings on plastics such as silver on polystyrene and the thickness of multiple coatings such as chromium on copper on iron. The coatings measured by my method need not even be metallic but need only contain a trace of a suitable element or compound. This trace material may be present as a filler or pigment or may be added as a tracer for the purpose of this determination. Thus, by my method, it is possible to determine the thickness of a thin rubber or plastic coating by measuring the intensity of the X-radiation given off by a filler such as zinc oxide. The thickness of a wet or dry paint film may also be determined by the same means. If the coating contains no metallic material that is suitable for the production of X-radiation a trace of such a material may be added to the coating for the purpose of this determination. Thus, for example, by adding a trace of titanium dioxdie, it is possible to determine the thickness of a clear varnish coating on wood and the thickness of a lubricant oil film on metal. If the elements in the coating are separated by a sufficient number of atomic numbers from elements in the base, it is possible to selectively excite only the elements in the coating and avoid the use of filters and electronic circuits and differentiate between characteristic radiation of the elements in the coating and in the base. More particularly, if the coating contains lighter weight elements than the base which are separated from the base elements by several atomic numbers, X-irradiation of the sample with X-radiation having a wave-length longer than the absorption edges of the elements in the base excites only the coating elements fluorescence and these can be used directly to determine the thickness of the coating.

The invention will now be described in connection with the drawing in which.

Figure 1:
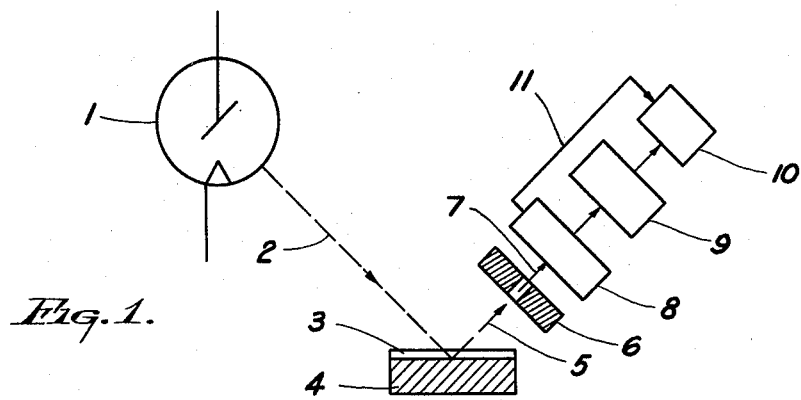
Fig. 1 shows a device for measuring thickness of a thin coating on a substratum in accordance with my invention.

By the use of the apparatus shown in Fig. 1, it is possible to measure the thickness of coatings containing at least one element which is of a much lower atomic number than any element in the base. Thus, the apparatus illustrated by Fig. 1 may be used to determine the thickness of a thin coating of chromium on copper. First a number of samples of known coating thicknesses of chromium on copper are placed in the position indicated by the sample of the coating 3 on the base 4 so that X-radiation 2 from an X-radiation source 1 such as an X-ray tube with an iron target and operated at 8.5K volts penetrates the coating. Only fluorescent X-radiation from the chromium is produced. This radiation 5 is sent through a collimator or a set of apertures 6 which confine the utilized fluorescent radiation to the beam 7 and into a detector 8 which may be a proportional counter or a scintillation counter where the X-radiation is converted into electronic impulses of amplitude proportional to the energies of the X-ray quanta. These electronic impulses are then sent by bypass means 11 to an indicator 10 which may be an ammeter which gives a visual indication of the intensity or rate of the electronic impulses. By use of a series of these samples of known coating thicknesses a calibration curve of coating thickness vs. rate of the resultant electronic impulse may be plotted. The thickness of a chromium coating of unknown thickness on copper is then easily determined by measuring the intensity of its fluorescent X-radiation when irradiated under the same conditions as the known samples and reading off the thickness from the calibration curve.

Figure 3:
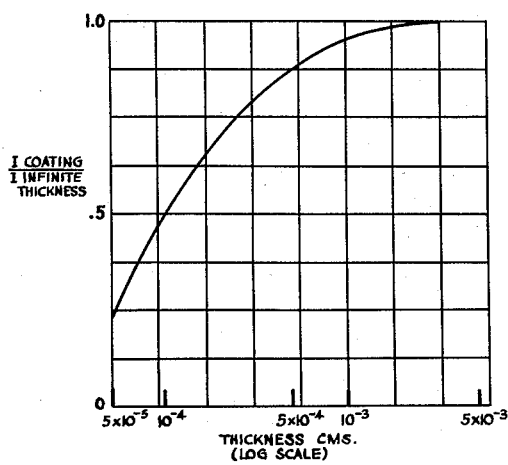
Fig. 3 shows a calibration chart for measuring the thickness of a zinc plating on steel.

With a slight modification the apparatus illustrated by Fig. 1 may be used to measure the thickness of a thin coating containing only an element or elements of a higher atomic number than any element in the base, for example the thickness of a thin coating of zinc on iron. In order to determine the thickness of zinc on iron the same procedure is followed as for the previous determination of chromium on copper. However, in the instant case, the electronic impulses produced by the detector 8 consists of a mixture of electronic impulses caused by the fluorescent X-radiation from the zinc and also electronic impulses caused by the fluorescent X-radiation from the iron. Therefore, in order to separate the impulses due to the zinc fluorescent radiation from that due to the iron fluorescent X-radiation the mixture of electronic impulses from the detector 8 is sent into a pulse amplitude discriminator 9 which is set so to stop the passage of any electronic impulse of an amplitude less than that of the zinc. Since the zinc fluorescent X-radiation is composed of much higher energy quanta than those of the iron fluorescent X-radiation, the resultant electronic impulses of the zinc fluorescent X-radiation are also of a much higher amplitude and thus the pulse amplitude discriminator 9 stops the passage of any electronic impulse due to iron fluorescent X-radiation and only allows the electronic impulse due to the zinc fluorescent X-radiation to enter the indicator 10. By this method the calibration curve of zinc thickness vs. intensity of radiation as shown by Fig. 3 was prepared.

By the same apparatus as is used to determine the thickness of a thin coating of zinc on iron and in the same manner a non-metallic coating on metal on a non-metal base may be determined. For example, the thickness of a rubberized or adhesive coating on paper, glass or metal may be determined by irradiating a filler or plasticizer such as zinc oxide in the rubber and determining the intensity of the fluorescent X-radiation from this zinc. If there is no suitable constituent such as zinc oxide present in the coating as a filler a very small amount may be added as a trace element to enable measurement of fluorescent X-radiation from the coating.

Figure 2:
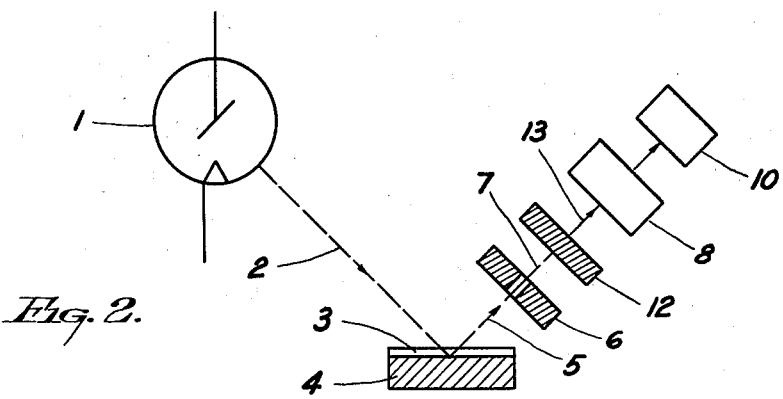
Fig. 2 shows another embodiment of the device for carrying out the method according to my invention.

If the coating contains an element which is of a lower atomic number than any element in the base but is only separated from it by one, two or only a few atomic numbers, its thickness may be determined by an apparatus such as illustrated by Fig. 2. In Fig. 2 all the numerals have the same significance as in Fig. 1 except that the pulse amplitude discriminator 9 is eliminated and a filter 12 is added to filter out any fluorescent X-radiation from the base while allowing fluorescent X-radiation from the coating to pass through. This filter is an element whose atomic number falls between that of the base element and the coating element or is the coating element. From the filter 12 the fluorescent X-radiation due only to the coating is sent into the detector 8.

The apparatus illustrated by Fig. 2 may be used to determine the thickness of chromium on iron in the same manner as followed for the previous determination of chromium on copper. However, in this case the X-ray tube uses a copper target with an excitation voltage of 10 kv. and 12 is a chromium filter which stops fluorescent X-radiation from iron but allows fluorescent X-radiation from the chromium coating to pass through into the detector 8 and from there the electronic impulse to the fluorescent radiation of the chromium is sent into the indicator 10.

While I have described my invention in connection with specific embodiments and applications, other modifications thereof will be readily apparent to those skilled in this art without departing from the spirit and scope of the invention as recited in the appended claims.

What I claim is:

1. A method of determining the thickness of a layer of known composition on a base of chemically disparate material, said layer containing an element other than those present in the base comprising the steps, exposing with respect to the surface of said layer an area of given cross-section at an angle to a beam of primary X-radiation having an intensity and wave-length sufficient to at least generate secondary X-rays from said element in said layer, rejecting secondary X-rays generated by elements in said layer and said base other than said element in said layer to thereby allow a measurement only of the intensity of the secondary X-rays generated by said element, and comparing the intensity of the secondary X-rays generated by said element with the intensity of secondary X-rays generated by a layer of known thickness and containing a known amount of said element to thereby determine the thickness of said first-mentioned layer.

2. A method of determining the thickness of a layer of known composition on a base of chemically disparate material, said layer containing an element other than those present in the base comprising the steps, exposing with respect to the surface of said layer an area of given cross-section at an angle to a beam of primary X-radiation having an intensity and wave-length sufficient to at least generate secondary X-rays from said element in said layer, detecting the secondary X-rays generated by said element in said layer to produce an electrical signal proportional to the energies of the X-ray quanta of said secondary X-rays, rejecting electrical signals proportional to the energies of the X-ray quanta of the secondary X-rays generated by elements in said layer and said base other than those proportional to the energies of the X-ray quanta of the secondary X-rays generated by said element to thereby allow a measurement only of the intensity of the secondary X-rays generated by said element, and comparing the intensity of the secondary X-rays generated by said element with the intensity of secondary X-rays generated by a layer of known thickness and containing a known amount of said element to thereby determine the thickness of said first-mentioned layer.

3. A method of determining the thickness of a layer of known composition on a base of chemically disparate material, said layer containing an element other than those present in the base comprising the steps, exposing with respect to the surface of said layer an area of given cross-section at an angle to a beam of primary X-radiation having an intensity and wave-length sufficient to at least generate secondary X-rays from said element, detecting the secondary X-rays generated by said element in said layer and X-rays generated by other elements in said layer and said base to produce electrical pulses whose amplitudes are proportional to the energies of the X-ray quanta of the secondary X-rays produced by the respective elements, electrically discriminating between pulses of different amplitudes to allow measurement of the pulses corresponding only to the secondary X-rays generated by said element in said layer thereby rejecting secondary X-rays generated by elements other than said element in said layer and allowing a measurement only of the intensity of the secondary X-rays generated by said element, and comparing the intensity of the secondary X-rays generated by said element with the intensity of secondary X-rays generated by a layer of known thickness and containing a known amount of said element to thereby determine the thickness of said first-mentioned layer.

4. A method of determining the thickness of a non-metallic layer of known composition on a base of chemically disparate material, said layer containing an element other than those present in the base comprising the steps, exposing with respect to the surface of said layer an area of given cross-section at an angle to a beam of primary X-radiation having an intensity and wave-length sufficient to at least generate secondary X-rays from said element, detecting the secondary X-rays generated by said element in said layer and secondary X-rays generated by other elements in said layer and said base to produce electrical pulses whose amplitudes are proportional to the energies of the X-ray quanta of the secondary X-rays produced by the respective elements, electrically discriminating between pulses of different amplitudes to allow measurement only of the pulses corresponding to the secondary X-rays generated by said element in said layer, and comparing the intensity of the secondary X-rays generated by said element with the intensity of secondary X-rays generated by a layer of known thickness and containing a known amount of said element to thereby determine the thickness of said first-mentioned layer.

5. A method of determining the thickness of a zinc layer on an iron base comprising the steps, exposing with respect to the surface of said layer an area of given cross-section at an angle to a beam of primary X-radiation having an intensity and wave-length sufficient to at least generate secondary X-rays from the zinc, detecting the secondary X-rays generated by the zinc and the iron to produce electrical pulses whose amplitudes are proportional to the energies of the X-ray quanta of the secondary X-rays generated by the iron and the zinc respectively, electrically discriminating between pulses of amplitudes corresponding to the secondary X-rays generated by the zinc and the iron respectively to thereby allow a measurement only of the intensity of the secondary X-rays generated by the zinc, and comparing the intensity of the secondary X-rays generated by the zinc with the intensity of secondary X-rays generated by a zinc layer of known thickness to thereby determine the thickness of the first-mentioned zinc layer.

6. A method of determining the thickness of a layer of known composition on a base of chemically disparate material, said layer containing an element having an atomic number lower than any element present in the base comprising the steps, exposing with respect to the surface of said layer an area of given cross-section at an angle to a beam of primary X-radiation having an intensity and wave-length sufficient to generate secondary X-rays from said element and from elements which are in said base, transmitting the secondary X-rays thus produced through an element having an atomic number lower than that of said element in the base and at least equal to the element in said layer to reject secondary X-rays generated by elements other than said element in said layer and thereby allow a measurement only of the intensity of the secondary X-rays generated by said element, and comparing the intensity of the secondary X-rays generated by said element with the intensity of secondary X-rays generated by a layer of known thickness and containing a known amount of said element to thereby determine the thickness of said first-mentioned layer.

7. A method of determining the thickness of a chromium layer on an iron base comprising the steps, exposing with respect to the surface of said layer an area of given cross-section at an angle to a beam of primary X-radiation having an intensity and wave-length sufficient to at least generate secondary X-rays from the chromium and from the iron, transmitting the secondary X-rays generated by the chromium and the iron through a chromium filter to reject secondary V-rays generated by the iron to thereby allow a measurement only of the intensity of the secondary X-rays generated by the chromium, and comparing the intensity of the secondary X-rays generated by the chromium with the intensity of secondary X-rays generated by a chromium layer of known thickness to thereby determine the thickness of said first-mentioned chromium layer.

References Cited in the file of this patent

UNITED STATES PATENTS

| | | |
|---|---|---|
| 2,449,066 | Friedman | Sept. 14, 1948 |
| 2,642,537 | Carroll et al. | June 16, 1953 |
| 2,846,589 | Pellissier et al. | Aug. 5, 1958 |